(12) United States Patent
Kempter et al.

(10) Patent No.: US 12,485,289 B2
(45) Date of Patent: Dec. 2, 2025

(54) MEDICAL HANDLING SET

(71) Applicant: Neuroloop GmbH, Freiburg (DE)

(72) Inventors: Daniel Kempter, Freiburg (DE); Fabian Kimmig, Freiburg (DE); Tim Boretius, Freiburg (DE)

(73) Assignee: NEUROLOOP GMBH, Freiburg (DE)

( * ) Notice: Subject to any disclaimer, the term of this patent is extended or adjusted under 35 U.S.C. 154(b) by 418 days.

(21) Appl. No.: 18/001,910

(22) PCT Filed: Jun. 9, 2021

(86) PCT No.: PCT/EP2021/065423
§ 371 (c)(1),
(2) Date: Dec. 15, 2022

(87) PCT Pub. No.: WO2022/002543
PCT Pub. Date: Jan. 6, 2022

(65) Prior Publication Data
US 2023/0293894 A1  Sep. 21, 2023

(30) Foreign Application Priority Data

Jun. 30, 2020  (DE) .................. 10 2020 117 142.0

(51) Int. Cl.
*A61N 1/375* (2006.01)
*A61N 1/05* (2006.01)

(52) U.S. Cl.
CPC .......... *A61N 1/3752* (2013.01); *A61N 1/0556* (2013.01)

(58) Field of Classification Search
CPC ................ A61N 1/3752; A61N 1/3754; A61N 2001/058; A61N 1/0556
See application file for complete search history.

(56) References Cited

U.S. PATENT DOCUMENTS

| 4,971,057 A | 11/1990 | Theres |
| 5,050,602 A | 9/1991 | Osypka |
| 2004/0230267 A1 | 11/2004 | Wenger |
| 2006/0030918 A1 | 2/2006 | Chinn et al. |

(Continued)

FOREIGN PATENT DOCUMENTS

| DE | 102018213120 A1 | 2/2020 |
| EP | 3204105 B1 | 8/2018 |

OTHER PUBLICATIONS

International Search Report for PCT/EP2021/065423 mailed Jun. 30, 2020; 12 pages.

*Primary Examiner* — Alyssa M Alter
(74) *Attorney, Agent, or Firm* — Fitch, Even, Tabin & Flannery LLP

(57) ABSTRACT

A medical handling which connects two implants arranged spatially separated from each other, by a flexible connecting line, along which a mechanical interface forms a plug-socket connection. The handling set comprises a tube and a mandrin which is internally guided therein and provides a mandrin tip, fixedly attached to a distal mandrin region which is a releasable first joint. In the joined state the handling set projects beyond the distal tube end. A first joining contour, which is part of a second joint, as well as an adapter element with a counter joining contour which is contoured counter to the first joint forms a second join, and a second joining contour contoured counter to the plug or socket of the mechanical interface which is part of a third joint.

20 Claims, 1 Drawing Sheet

(56) References Cited

U.S. PATENT DOCUMENTS

| | | |
|---|---|---|
| 2007/0255093 A1* | 11/2007 | Lau ................. A61B 17/00234 |
| | | 600/37 |
| 2008/0255630 A1 | 10/2008 | Arisso et al. |
| 2011/0270068 A1 | 11/2011 | Mehdizadeh et al. |
| 2013/0324994 A1 | 12/2013 | Pellegrino et al. |

* cited by examiner

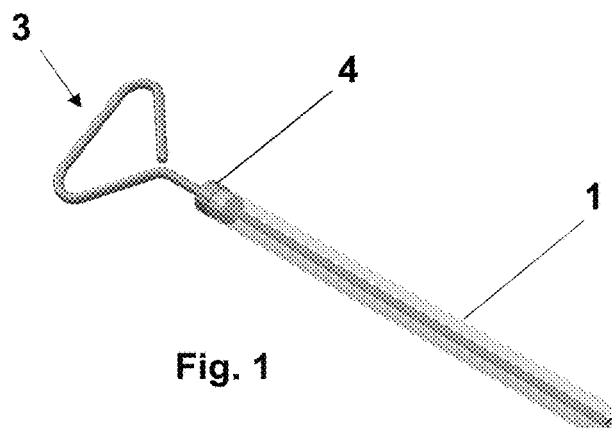
Fig. 1
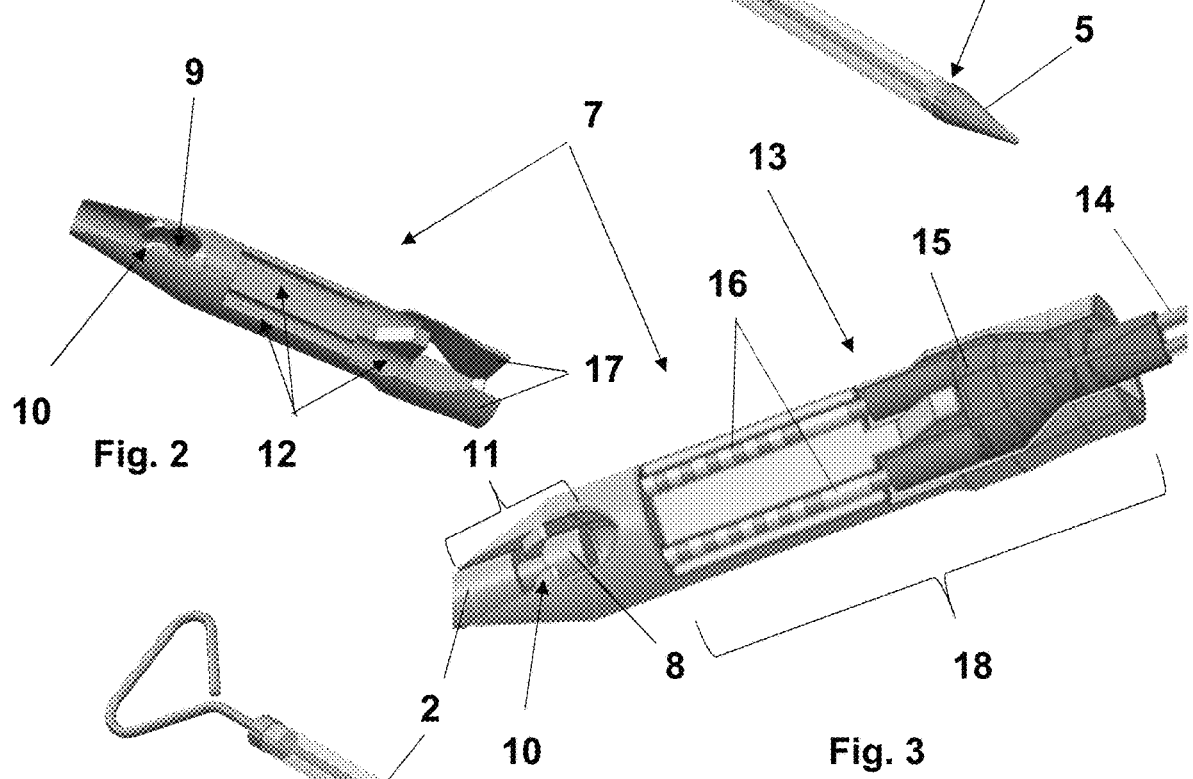
Fig. 2
Fig. 3
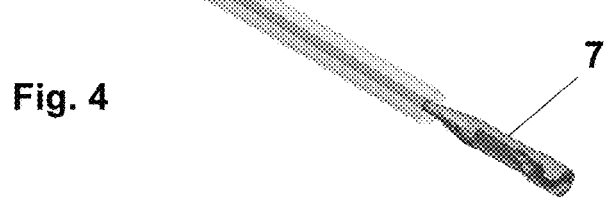
Fig. 4

MEDICAL HANDLING SET

CROSS-REFERENCE TO RELATED APPLICATIONS

Reference is made to PCT/EP2021/065423 filed Jun. 9, 2021, and German Patent Application No. 10 2020 117 142.0 filed Jun. 30, 2020, which are incorporated herein by reference in their entirety.

BACKGROUND OF THE INVENTION

Field of the Invention

The invention relates to a medical handling set for connecting two implants, which are arranged spatially separated from each other, by a flexible connecting line, along which a mechanical interface which is a plug and socket connection islocated.

Description of the Prior Art

Implantable medical devices for the purpose of electrical stimulation of local intracorporeal regions (in short implantable pulse generators (IPG)), for example for cardiac treatment, defibrillation, pacemakers as well as resynchronization applications, for neurostimulation measures, such as, for example, spinal cord simulation, brain stimulation or vagus nerve stimulation etc., as a general rule comprise a self-contained housing containing components for electrical pulse generation, at least one electrical energy source, either a battery or an induction coil, and an electrical circuit structure connected thereto. In addition, in most cases, adjoining the housing is a head part, containing an electrical contact assembly electrically connected to the energy supply and to the electrical circuit structure, into which a plug assembly can inserted, which closes the head part in a fluid-tight manner and is connected by the electrical supply and outlet leads, which are typically combined into one flexible connection line, to at least one separate intracorporeal electrode assembly which is used for the intracorporeal local application of electrical stimulation signals, as well as the diversion of locally picked up electrical signals to the electrical circuit structure present in the housing.

Disclosed in EP 3 204 105 B1 is an implantable electrode assembly, which, for the purpose of the electrical stimulation of selected nerve fibers along the vagus nerve is locally applied in a cuff around the vagus nerve in the neck area in a cuff electrode assembly. In contrast to this, the implant housing, IPG (implantable pulse generator) which encloses all the electrical components necessary for the operation and function of the electrical stimulation, is located in a surgically easily accessible area, preferably at a point under the collarbone.

For the purpose of implanting both the cuff electrode assembly and also the IPG, two skin incisions are made. One is in the chest area is for positioning the IPG, and the other is in the neck region mounting the cuff electrode assembly along the vagus nerve. Typically, on one side the cuff electrode assembly is fixedly provided with a flexibly designed electrical connection line, on which at the end of the line opposite the cuff electrode assembly, an electrical interface, preferably a multiple pole plug part is located, for fitting into a socket provided on the IPG.

In order to keep the weight and size associated with this surgical intervention as light as possible for the patient, the intracorporeal placement of the flexible, electrode connection line between the IPG and the cuff electrode assembly must be as considerate as possible. In addition, the operating surgeon should be able to complete the intervention required for this safely and accurately in as short a time as possible.

US published patent application 2013/0324994 A1 discloses systems for the modulation of nerves in bones which provide a tube with a mandrin guided therein with a tip firmly applied at a distal mandrin region which projects beyond the distal tube end.

SUMMARY OF THE INVENTION

The invention is a medical handling set for connecting two implants spatially separated from each other by use of a flexible electrical connection line, along which a mechanical interface of the plug and socket type connection is provided, causing the two implants, located at different intracorporeal regions, to be connected by way of the flexible electrical connection line which is gentle on the patient, that is without or largely without dermatological irritation. Furthermore, the medical aids required for this should make intuitively simple, accurate and quick handling possible for the operating surgeon during the surgical placement procedure.

The medical handling set according to the invention for connecting two implants, which are arranged spatially separated from each other, by use and a flexible electrical connecting line, along which a mechanical interface in the form of a plug-socket connection is provided, which comprises a tube and, guided therein, a mandrin which has a mandrin tip. The mandrin tip is fixedly attached to the distal mandrin region in a releasable manner by means of a first joint and in the joined state protrudes beyond the distal tube end.

Preferably, the mandrin tip adjoins the distal tube end in a flush, preferably fluid-tight coupling, in order to thereby prevent the penetration of body fluids, in particular blood, into the lumen of the tube during a tissue penetration procedure.

The mandrin tip is applied to the distal mandrin region by a releasable, fixed first joint connection. The first joint is preferably a thread-counterthread connection or a bayonet closure in order, on the one hand to ensure firm fixation of the mandrin tip on the mandrin during the surgical intervention, and, on the other hand, to allow the operating surgeon to remove the mandrin tip from the distal mandrin region quickly and easily.

In addition, the distal mandrin region has a first joining contour which is part of a second joint, which preferably differs from the first joint in terms of type and design.

Furthermore, the medical handling set according to the invention comprises a separate adapter element that has a counter joining contour that is contoured counter to the first joining contour in order to form the second joint. The adapter element also has a second joining contour, that is contoured counter to the plug or socket part of the mechanical interface and is suitable for forming a third joint. In contrast to the first joint between the mandrin tip and the distal mandrin region, the second and third joints are comparable in terms of type and design and are preferably based on a snap-in and/or locking mechanism.

In a preferred embodiment, the first joint on the distal mandrin region has a head-shaped structure that can be fitted into the concave counter joining contour provided on the adapter element by a pressing force-assisted manner while producing an acoustically perceivable snap-in sound. Alternatively, it is possible to concavely design the joining contour provided on the distal mandrin region, into which an appropriately counter-contoured head-shaped structure on the adapter element can be inserted in a pressing force-assisted manner. The acoustic perception is based on an impulse-like joint collision, brought about by a type of impact effect between the two joining parts which is only produced in the case of successful joining, so that for the operating surgeon the perceivable joining sound can be evaluated as a signal that confirms successful joining. This type of acoustic reconfirmation is of value to the operating surgeon, particularly due to the small size of the components and the confined spatial conditions while performing the operation. The operating surgeon is not always in visual contact with the individual instruments.

The second joining contour provided on the adapter element is at least partially contoured counter to the plug or socket part provided on the end of the flexible connection line, so that it is possible to place the plug or socket part on the second joining contour provided on the adapter element and firmly secure it in a releasable manner on the adapter element in an axially and rotationally fixed manner by a locking or snap-in mechanism. The second joining contour provided for this on the adapter element is specially matched to the design of the plug or socket part. Alternatively, in the case of a plug part provided on the end of the flexible connecting line, the second joining contour is designed in the manner of a blind hole arrangement, into which the pin-like plug part can be fixedly fitted. In the case of a socket part provided on the flexible connecting line, the second joining contour provided on the adapter element is designed a plug to be releasably fixedly fitted in the socket part.

To secure this third joint forming between the adapter element and the plug or socket part provided on the flexible connecting line, the second joining contour has at least one clamping jaw which comes to rest on an outer contour provided on the plug or socket part in a positive or non-positive manner.

Preferably, the adapter element is cylindrical and has, on its two cylinder end regions opposite each other along the cylindrical axis, the counter joining contour on the one hand, and the second joining contour on other hand. In the joined state, the adapter element as well as the joining contour of the flexible connecting line being a plug or socket part, having a maximum cross-sectional diameter which is smaller in dimension than a diameter assigned to the tube, so that the adapter element can axially fully pulled into and through the tube while forming the second and third joint.

A preferred example of embodiment is illustrated in the following figures.

BRIEF DESCRIPTION OF THE DRAWINGS

The invention is described below without restricting the general inventive concept, by way of examples of embodiments with reference to the drawings. In these:

FIG. 1 shows a tube with an internally guided mandrin and distal mandrin tip;

FIG. 2 shows a view of an adapter element;

FIG. 3 shows an adapter element with an inserted plug; that is provided at the end on the flexible connecting line; and FIG. 4 shows a tube with an internally guided mandrin, which on the mandrin tip the adapter element is provided.

DETAILED DESCRIPTION OF THE INVENTION

FIG. 1 shows a tube 1 configured as a hollow cannula, in the interior of which is a mandrin 2. The proximal end of the mandrin is formed with a handle for manual operation and allows the operating surgeon to exert controlled axial tensile and thrust forces along the mandrin 2 and the tube 1, as well as torsion moments orientated about the longitudinal axis of the mandrin.

The proximal end of the tube 1 is fixedly placed in a releasable manner on a stop 4 applied on the mandrin 2, through which the thrust forces acting on the mandrin 2 are transmitted to the tube 1. At its distal mandrin region, by way of a first joint, the mandrin 2 is fixedly connected in a releasable manner to a mandrin tip 5. The first joint 6 is preferably a thread-counterthread connection or a bayonet closure which firmly fixes the mandrin tip 5 to the distal mandrin region of the mandrin 2 in a releasable manner. For example, for this, at its distal mandrin end, the mandrin 1 has an external thread which engages with an internal thread of the mandrin tip 5.

The medical instrument illustrated in FIG. 1 has a tube 1 and an internally guided mandrin 2. The mandrin tip 5 has a fluid-tight contact on the distal tube end, which is intended for intracorporeal cannulation, i.e. the introduction of a throughput channel through an intracorporeal tissue region. In connection with the initially described implantation of the cuff electrode assembly and the IPC, the medical instrument shown in FIG. 1 is tunnelled from the chest area in the direction of the cuff electrode assembly just under the skin surface in an as tissue-sparing manner as possible in order to produce a connection channel, along which the electrical connecting line between the cuff electrode assembly and the IPG is to run.

After tunnelling, the mandrin tip 5 projects outwards from a corporeal opening made in the area of the vagus nerve, so that the operating surgeon can separate the mandrin tip 5 by undoing the first joint from the distal mandrin region. An adapter element 7 illustrated in FIGS. 2 and 3 is then joined to the distal mandrin region.

For this, distally the mandrin 2 has a first joining contour formed into a head as shown in FIG. 3. In contrast, designed on one side is the adapter element 7 a counter joining contour 9 contoured counter to the first joint 8. In the case of the embodiment shown in FIGS. 2 and 3 is as a concave recess. The counter joining contour 9 has a bottleneck snap-in or locking mechanism 10 which ensures that after pressing a force-assisted fitting into the counter joining contour 9, the first joining contour 8 of the mandrin 2 is axially firmly connected to the adapter element 7. The thus produced second joint 11 allows transmission of thrust and tensile forces between the mandrin 2 and the adapter element 7. Not by necessity, the second joint 11 is configured in a rotationally fixed manner about the longitudinal axis of the mandrin.

The snap-in/locking mechanism 10 is also assembled so that a pressing force-loaded joining force has to be overcome in order to transfer the joining contour 8 into the counter joining contour 9. The joining process takes place instantly, that is the head-shaped first joining contour 8 impacts into the concave recess of the counter joining contour 9, by which a snap-in or locking sound occurs which is perceivable by the operating surgeon. This serves as an acknowledgement or check of complete and secure forming of the second joint 11.

In addition, the adapter element 7, which is preferably formed as a cylindrical base body, has a second joining contour 12, which is individually matched to the plug part 13, which in each case is connected at the end to the flexible connecting line 14. The plug part 13 which is shown in FIG. 3 and is applied to the elastic connecting line 14, envisages a plug body 15 and two contact pins 16 extending therefrom. In accordance with the geometric design of the plug part 13, the second joining contour 12 of the adapter element 7 has a corresponding recess for the plug body 15 as well as for both contact pins 16.

Two clamping jaws 17, which are applied on the adapter element 7, hold the plug part 13 in a fixed position relative to the adapter element 7. In this case too, it is necessary to overcome a minimum joining pressing force, which during the production of the third joint 18 shown in FIG. 3, results in the generation of a snap-in or locking sound that is audibly perceivable by the operating surgeon. For the doctor this serves as a reliable indication that the plug part 13 has been correctly and securely connected in the adapter part 7.

The design of the first and the second joint 11, 18 which is formed as a snap-in or locking connection, allows uncomplicated and rapid handling by the doctor and also produces an acoustically perceivable sound.

FIG. 4 shows a state of the medical instrument at the distal mandrin region the adapter element 7 which is fitted at which the plug part 13 is inserted (not shown). The mandrin 2 is pulled through the tube 1 proximally relative to the tube 1, which remains fixed. As a result the elastic connecting line 14 connected to the plug part 13 is pulled proximally through the tube 1. As soon as the adapter element 7 projects out at the proximal end of the tube 1, the plug part 13 is smoothy released from the adapter element 7 and fitted into the socket preferably provided on the IPG.

LIST OF REFERENCE NUMBERS

1 Tube
2 Mandrin
3 Handle, proximal end of the mandrin
4 Mechanical stop
5 Mandrin tip
6 First joint
7 Adapter element
8 First joining contour
9 Counter joining contour
10 Snap-in/locking mechanism
11 Second joint
12 Second joining contour
13 Plug part
14 Elastic connecting line
15 Plug body
16 Contact pins
17 Clamping jaws
18 Third joint

The invention claimed is:

1. A medical handling set configured for connecting spaced apart intracorporeal implants with a flexible connecting line within a patient, comprising:
a tube for containing a mandrin which is guided within the tube and includes a tip which protrudes beyond a distal end of the tube and which comprises means configured for performing intracorporeal cannulation within the patient with the tip being releasably attached to a first joint at a distal end region of the mandrin;
a first joining contour at the distal end region of the mandrin; and
an adapter including a first counter contour which faces the first joining contour and a second joint contacting a second joining contour.

2. A medical handling set according to claim 1, wherein: the first joint comprises a threaded connection or a bayonet closure.

3. A medical handling set according to claim 2, comprising a third joint; and
the second and third joints comprise a snap-in or a locking mechanism which includes means for producing an acoustically perceivable sound.

4. A medical handling set according to claim 3, wherein:
the first joining contour includes a head and a counterjoining contour which is concave with the first joining contour fitting into the counterjoining contour and produces the acoustically perceivable sound.

5. A medical handling set according to claim 4, wherein the tube contains the adapter, and wherein:
the adapter and the joining contour have a maximum cross-sectional diameter smaller than a diameter of the tube which permits the adapter to be axially positioned within the tube.

6. A medical handling set according to claim 3, wherein:
the flexible connecting line has at least one end including a socket or plug; and
the socket or plug is spatially fixed relative to the adapter.

7. A medical handling set according to claim 2, wherein:
the first joining contour includes a head and a counterjoining contour which is concave and includes means for producing an acoustically perceivable sound when upon application of a connecting force, the first joining contour fits into the counterjoining contour and produces an acoustically perceivable sound.

8. A medical handling set according to claim 7, wherein the tube contains the adapter, and wherein:
the adapter and the joining contour have a maximum cross-sectional diameter smaller than a diameter of the tube which permits the adapter to be axially positioned within the tube.

9. A medical handling set according to claim 2, wherein:
the flexible connecting line has at least one end including a socket or plug; and
the socket or plug is spatially fixed relative to the adapter.

10. A medical handling set according to claim 2, wherein:
the second joining contour includes at least two jaws which are connectable to an outer contour of a plug and socket connection.

11. A medical handling set according to claim 1, comprising a third joint; and
the second and third joints comprise a snap-in or a locking mechanism which includes means for producing an acoustically perceivable sound.

12. A medical handling set according to claim 11, wherein:
the first joining contour includes a head and a counterjoining contour which is concave with the first joining contour fitting into the counterjoining contour and produces the acoustically perceivable sound.

13. A medical handling set according to claim 12, wherein the tube contains the adapter, and wherein:
the adapter and the joining contour have a maximum cross-sectional diameter smaller than a diameter of the tube which permits the adapter to be axially positioned within the tube.

14. A medical handling set according to claim 11, wherein:
the flexible connecting line has at least one end including a socket or plug; and
the socket or plug is spatially fixed relative to the adapter.

15. A medical handling set according to claim 11, wherein:

the second joining contour includes at least two jaws which are connectable to an outer contour of a plug and socket connection.

16. A medical handling set according to claim 1, wherein:
the first joining contour includes a head and a counterjoining contour which is concave and includes means for producing an acoustically perceivable snap-in sound when upon application of a connecting force, the first joining contour fits into the counterjoining contour which produces an acoustically perceivable snap-in sound.

17. A medical handling set according to claim 16, wherein the tube contains the adapter, and wherein:
the adapter and the joining contour have a maximum cross-sectional diameter smaller than a diameter of the tube which permits the adapter to be axially positioned within the tube.

18. A medical handling set according to claim 1, wherein:
the flexible connecting line has at least one end including a socket or plug; and
the socket or plug is spatially fixed relative to the adapter.

19. A medical handling set according to claim 1, wherein:
the adapter comprises a cylinder including a cylindrical axis and two cylinder ends which are positioned opposite each other along the cylindrical axis.

20. A medical handling set according to claim 1, wherein:
the second joint includes at least two jaws which are connectable to an outer contour of a plug and socket connection.

* * * * *